United States Patent
Alizadeh-Shabdiz et al.

(10) Patent No.: US 9,408,037 B1
(45) Date of Patent: Aug. 2, 2016

(54) TECHNIQUES FOR OPTIMIZING SELECTION AND UPDATE OF A RELEVANT SUBSET OF WI-FI AP LOCATION INFORMATION BY A MOBILE CLIENT DEVICE TO EFFICIENTLY UTILIZE RESOURCES

(71) Applicant: Skyhook Wireless, Inc., Boston, MA (US)

(72) Inventors: Farshid Alizadeh-Shabdiz, Wayland, MA (US); Nicolas Brachet, Newton, MA (US); Andrei Dancus, Burlington, MA (US); Thomas Jason Dytko, Somerville, MA (US); Russel Kipp Jones, Roswell, GA (US)

(73) Assignee: Skyhook Wireless, Inc., Boston, MA (US)

( * ) Notice: Subject to any disclaimer, the term of this patent is extended or adjusted under 35 U.S.C. 154(b) by 0 days.

(21) Appl. No.: 14/461,115

(22) Filed: Aug. 15, 2014

Related U.S. Application Data (60) Provisional application No. 61/866,434, filed on Aug. 15, 2013.

(51) Int. Cl.
H04W 4/02 (2009.01)

(52) U.S. Cl.
CPC .................................... H04W 4/028 (2013.01)

(58) Field of Classification Search
CPC ..... H04W 4/028; H04W 4/027; H04W 4/025; H04W 4/026; H04W 4/02; H04W 4/0201; H04W 4/023
USPC ......................... 455/456.1, 456.5, 456.6, 457
See application file for complete search history.

(56) References Cited

U.S. PATENT DOCUMENTS

| | | | |
|---|---|---|---|
| 5,852,630 A * | 12/1998 | Langberg et al. | ............. 375/219 |
| 7,305,245 B2 | 12/2007 | Alizadeh-Shabdiz et al. | |
| 7,414,988 B2 | 8/2008 | Jones et al. | |
| 7,551,579 B2 | 6/2009 | Alizadeh-Shabdiz et al. | |
| 8,369,264 B2 | 2/2013 | Brachet et al. | |
| 2005/0037775 A1* | 2/2005 | Moeglein et al. | .......... 455/456.1 |
| 2006/0089157 A1* | 4/2006 | Casey et al. | ................ 455/456.3 |
| 2007/0202888 A1* | 8/2007 | Brachet et al. | ............. 455/456.1 |

(Continued)

OTHER PUBLICATIONS

Hazas, M., et al., "Location-Aware Computing Comes of Age," IEEE, vol. 37, Feb. 2004, pp. 95-97.

(Continued)

*Primary Examiner* — Siu Lee
(74) *Attorney, Agent, or Firm* — Cesari and McKenna, LLP; James A. Blanchette

(57) ABSTRACT

In one embodiment, techniques are provided for efficiently selecting and distributing wireless local area network (WLAN) access point (AP) data to a mobile client device. A reference database is maintained on a network server. An expected future location of the mobile client device is determined. The expected future location represents a location different than a present location of the mobile client device, which the mobile client device is expected to visit in the future. One or more tiles are transferred from the reference database to the mobile client device for a bounded geographic region that includes the expected future location. The one or more tiles are stored on the mobile client device to be available for use in satisfying one or more subsequently received requests for estimation of location of the mobile device.

35 Claims, 9 Drawing Sheets

(56) References Cited

U.S. PATENT DOCUMENTS

| | | | |
|---|---|---|---|
| 2007/0258409 A1* | 11/2007 | Alizadeh-Shabdiz et al. | 370/331 |
| 2008/0176583 A1* | 7/2008 | Brachet et al. | 455/456.3 |
| 2011/0305361 A1 | 12/2011 | Li et al. | |
| 2013/0325326 A1* | 12/2013 | Blumenberg et al. | 701/428 |
| 2013/0337838 A1* | 12/2013 | Kolodziej | G06F 17/3087 455/456.3 |

OTHER PUBLICATIONS

Lamarca, Anthony et al., "Place Lab: Device Positioning Using Radio Beacons in the Wild" PERVASIVE 2005, LNCS 3468, co. 116-133, May 2005, pp. 1-18.

Muthukrishnan, K., et al., "Towards Smart Surroundings: Enabling Techniques and Technologies for Localization," Lecture Notes in Computer Science, vol. 3479, May 2005, 11 pages.

* cited by examiner

TECHNIQUES FOR OPTIMIZING SELECTION AND UPDATE OF A RELEVANT SUBSET OF WI-FI AP LOCATION INFORMATION BY A MOBILE CLIENT DEVICE TO EFFICIENTLY UTILIZE RESOURCES

RELATED APPLICATIONS

The present application claims priority to U.S. Provisional Patent Application 61/866,434 filed on Aug. 15, 2013 by Farshid Alizadeh-Shabdiz et al., for "METHODS AND SYSTEM FOR OPTIMIZING SELECTION OF A RELEVANT SUBSET OF WI-FI APS LOCATION INFORMATION TO A MOBILE CLIENT DEVICE AND UPDATE SO THAT THE CLIENT DEVICE MAY ESTIMATE ITS POSITION WITH EFFICIENT UTILIZATION OF RESOURCES", the contents of which are incorporated by reference herein in their entirety.

BACKGROUND

1. Technical Field

The present disclosure relates generally to determining the location of a mobile client device using a wireless local area network (WLAN) positioning system, and more specifically to techniques for efficiently selecting and distributing information to a mobile client device, as well as for refreshing information already stored on the mobile client device.

2. Background Information

In recent years the number of mobile client devices has increased significantly. At the same time, there has been an explosion of the number of applications used on, or in connection with, mobile client devices. Many applications customize information presented to a user based on location information (e.g., an estimated location of the mobile client device). For example, based on an estimated location of a mobile client device, location-dependent advertisements (e.g., an advertisement for a local restaurant rather than one far away) may be displayed, or a search may be configured to return location-dependent result (e.g., a list of the nearby restaurants rather than ones far away). In this manner, location information may enhance the experience of a user of a mobile client device.

There are a variety of different techniques that may be used to estimate the location of a mobile client device. Such techniques typically rely on a known set of anchor points that are used as references to estimate the location. The anchor points can be satellites, cell towers, Bluetooth devices, WLAN access points (APs), etc., depending on the particular techniques employed.

For example, techniques based on the Global Positioning System (GPS) operated by the U.S. government may leverage dozens of orbiting satellites as reference points. These satellites broadcast radio signals that are picked up by a GPS receiver of a mobile client device. The receiver measures the time it takes for a signal to travel to it. After receiving signals from three or more GPS satellites, the receiver can triangulate its position on the globe. For the system to work effectively, the radio signals typically need to reach the receiver with little or no interference. Weather, buildings, and foliage can interfere with this process, since receivers typically require a clear line-of-sight. Interference can also be caused by a phenomenon known as multi-path interference. With multi-path interference, radio signals from GPS satellites bounce off physical objects (e.g., structures), causing multiple signals from the same GPS satellite to reach the receiver at different times. Since the receiver's calculations are based on the time the signal took to reach the receiver, multi-path signals can confuse the receiver, and cause substantial errors.

Cell tower triangulation is another technique that may be used to determine the location of a mobile client device. Cell towers and the mobile client device communicate with each other to share signal information that can be used to identity cell towers and distances to the cell towers, to calculate the location of the mobile client device. This approach was originally thought to be more promising than GPS, since cellular signals do not require direct line of site and can penetrate buildings better than GPS signals. Unfortunately, cell tower triangulation has proven to be less than ideal, due in part to the heterogeneous nature of the cellular tower hardware, issues caused by multi-path signals, and a lack of uniformity in the positioning of cell towers.

Assisted GPS (A-GPS) is another technique, which combines both GPS and cell tower-based techniques to produce more accurate and reliable location calculation. In A-GPS, attempts are made to improve GPS signal reception by transmitting information to a mobile client device about the clock offsets of the GPS satellites, and the general location of the mobile client device, based on the location of a connected cell tower. This information may help the GPS receiver of the mobile client device to operate with weaker signals (e.g., that may be experienced indoors), and may help the GPS receiver to obtain a fix on satellites more quickly, to provide a faster first reading. However, A-GPS systems have been plagued by various problems, including slow response times and poor accuracy (e.g., greater than 100 meters in downtown areas).

Some WLAN positioning systems have also been used to estimate the location of mobile client devices. In some systems, WLAN AP data acquired by amateur scanners (known as "war drivers") who submit their WLAN scan data to public community web sites is stored. Client software executing on a mobile client device may use WLAN AP data to estimate a location of the mobile client device. Many existing WLAN positioning systems are designed to address asset and people tracking within a controlled environment of limited size, like a corporate building or campus, a hospital facility, a shipping yard, etc. In such cases, the amount of stored WLAN AP data may be relatively small. However problems are encountered in attempting to scale such systems to wide-area deployment (e.g., across an entire city, state, etc.).

Among a number of issues encountered is that amounts of WLAN AP data may grow so large that it is impossible or impractical to maintain a copy of it all on a mobile client device. Further it may be burdensome to constantly query a remotely maintained data source each time data are needed for positioning. In general, software operating on a mobile client device is constrained by the limited hardware capabilities of such devices, and by the costs of utilizing mobile resources and services. Hardware constraints may include memory capacity, available power (e.g., battery power), central processor unit (CPU) resources, network capacity and availability, and the like. Costs constraints may include fees for network access, fees for network bandwidth consumption, and the like. These constraints may burden any application executing on a mobile client device, and in particular creates a problem for WLAN positioning systems that have to access large amounts of WLAN AP data.

These problems are compounded by the frequently changing nature of WLAN AP data. Due to the transient nature of WLAN APs, which are often moved or decommissioned, stored data my need to be updated regularly, to ensure that it contains relatively current WLAN AP data. Any WLAN AP data transferred to a mobile client device at a previous time may become out-of-date as time passes.

Accordingly there is a need for improved techniques for efficiently selecting and distributing WLAN AP data to a mobile client device, as well as refreshing WLAN AP data stored on the mobile client device.

SUMMARY

Techniques are provided for efficiently selecting and distributing WLAN AP data from a central reference database on a network server to a mobile client device, as well as for refreshing WLAN AP data already stored on the mobile client device. In one embodiment, techniques utilize "tiles" of WLAN AP data and optimize which tiles are transferred and stored on the mobile client device. An expected future location of the mobile client device may be determined. The expected future location represents a location that may be different than the present location of the mobile client device. One or more tiles are transferred from the reference database to the mobile client device, where the expected future location is within a bounded geographic region of at least one of the tiles. The one or more tiles are stored on the mobile client device to be available for use in satisfying one or more subsequently received location requests for an estimated location of the mobile client device. That is, when a request for estimation of location of the mobile device is received, the location may potentially be calculated with the WLAN AP data of already stored on the mobile device.

The expected future location of the mobile client device may be determined in a variety of different ways. In one implementation, the expected future location is a user provided location. Alternatively, the expected future location may be determined based on information provided by an application executing on the mobile client device. For example, the application may be turn-by-turn navigation application, and the expected future location determined as a location along a route. In still other alternatives, the expected future location may be determined based on history of places the mobile client device has visited. Similarly, a wide variety of other predictive techniques may be used to determine the expected future location.

In another embodiment, techniques are provided for excluding and including certain WLAN AP data from a tile transferred to the mobile client device, for example, to reduce resource consumption (e.g., memory usage, power consumption, network bandwidth consumption, etc.) and costs (e.g., fees for network bandwidth consumption). One or more criteria may determine which data may be excluded. In one implementation, a criterion is a minimum required density of WLAN APs. Alternatively, a criterion may be a quality factor of WLAN APs. In still another alternative, a criterion may be an activity level of WLAN APs. Similarly, a wide variety of other criteria may be utilized to determine WLAN AP data that can be excluded. Further, other criteria may be utilized to determine WLAN AP data that should not be excluded (i.e. should be retained). For example, WLAN AP data for certain "high priority" APs within a tile may be retained. Priority may be based on a variety of different factors, such as a frequency of usage, places the mobile client device has visited in the past, and/or other factors.

In still another embodiment, techniques are provided for retaining and purging WLAN AP data on the mobile client device, and for updating and refreshing tiles stored on the mobile client device. A tile maintained on the mobile device may be retained or purged based on usage of that tile. Usage may be based on an average hit rate in a given period of time, where a hit represent a use of the WLAN AP data of the tile in estimation of a location of the mobile client device. Alternatively, usage may be based on a probability of using the tile, a type of application executing on the mobile client device, or some other factor. Further, tiles may be updated based on a condition of the mobile client device, such as an amount of available memory on the mobile client device, a type of a network connection of the mobile client device, an available bandwidth of the network connection, a cost of the network connection, a mode of motion of the mobile client device, a power source of the mobile client device, or some other condition. Further, a tile may be refreshed in response to a statistical measure. For example, the statistical measure may be a percentage of WLAN APs in the tile that have changed since the tile was transferred to the mobile client device.

It should be understood that the example embodiments discussed in this Summary may include a variety of other features, including other features discussed below, and variations thereof. Further a variety of other embodiments may be utilized. This Summary is intended simply as a brief introduction to the reader, and does not imply that the specific features mentioned herein are all the features of the invention, or are essential features of the invention.

BRIEF DESCRIPTION OF THE DRAWINGS

The Detailed Description below refers to the accompanying drawings of example embodiments, of which.

DETAILED DESCRIPTION

An Example WLAN Positioning System i. Overview

In general, a WLAN positioning system relies on WLAN APs (e.g., Wi-Fi APs compliant with an IEEE 802.11 wireless networking standard) to estimate the location of mobile client devices. As used herein, the term "mobile client device" refers to an electronic device that is equipped with a radio transceiver and designed to be transported from place to place by a person or in a vehicle. Examples of a "mobile client device" include a smartphone, a tablet computer, a laptop computer or other similar electronic devices. A location of a mobile client device maybe estimated based on the identity and characteristics of observed WLAN APs. Typically, each WLAN AP is associated with a unique identifier, for example, a media access control (MAC) address. Each WLAN access point may also be associated with another type of identifier, such as a service set identification (SSID). A mobile client device may observe WLAN access points in its vicinity, for example, by monitoring the broadcast signal of WLAN access points, or by requesting that WLAN access points identify themselves via a probe request. The mobile client device may then process the received signals from the WLAN access points, for example, by measuring received signal strength (RSSi), or a time of arrival of each signal, to determine characteristics of those signals. A WLAN positioning system can use the identifiers of the WLAN access points detected by the mobile client device, and the corresponding measurements/characteristics, in conjunction with information from a reference database, to determine location information (e.g., to estimate the location of a mobile client device). The reference database may be constructed beforehand, based on information that is collected, for example, through targeted data collection, through crowd-sourced data returned from the normal operation of mobile client devices, through user contributed data, or through some combination of the above and/or other modes of data collection.

The reference database of a WLAN positioning system may include one or both of two general categories of WLAN AP data, depending on the implementation. In the first category, the reference database may include an exact or estimated location of WLAN APs disposed across an extended geographic region (e.g., a city, a state, etc.). The location or estimated location of WLAN APs may be used as anchor points to estimate the location of mobile client devices. In the second category, the reference database may include signal measurements of signals transmitted from WLAN APs and locations at which the measurements were taken. WLAN AP signal measurements may include signal strength, for example, a received signal strength indicator (RSSi), a time of arrival, a difference in time of arrival from WLAN APs, etc. The second category of information sometimes is referred to as "fingerprint information." Fingerprint information may be used to build a statistical model for WLAN AP measurements at different locations across a geographic region (e.g., a city, a state, etc.), for example, to build a statistical model for RSSi or a statistical model for time of arrival.

Figure 1:
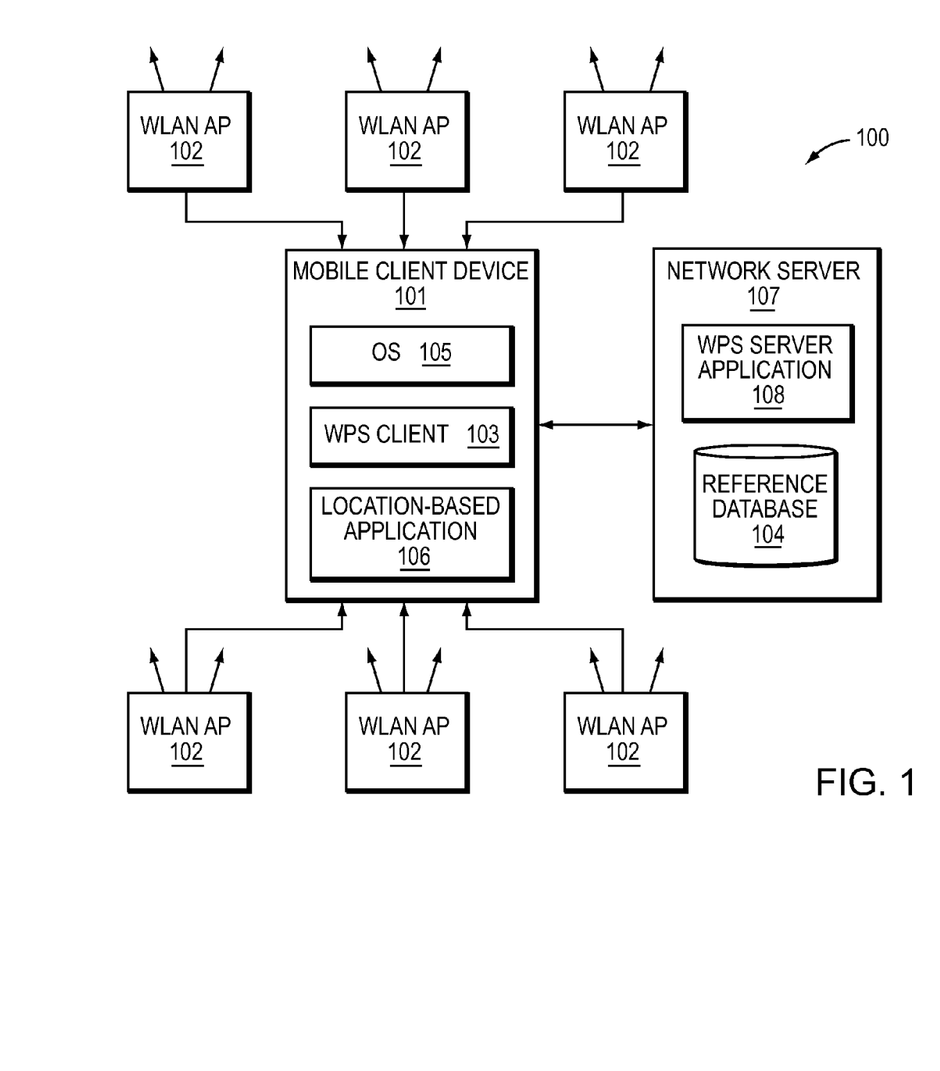
FIG. 1 is a block diagram of an example WLAN positioning system that may be used to estimate the location of a mobile client device.

FIG. 1 is a block diagram of an example WLAN positioning system 100 that may be used to estimate the location of a mobile client device 101. The mobile client device 101 may include a processor coupled to one or more storage devices, such as a main storage (e.g., a primary volatile or non-volatile storage device, such as a hard disk, flash memory, random access memory, etc.), and one or more subsystems that may include their own local storage (e.g., a local volatile or non-volatile storage device), for example, a WLAN network interface including local memory and a radio transceiver capable of sending and/or receiving WLAN (e.g., Wi-Fi) signals. The main storage may store executable instructions that include instructions for an operating system 105 and applications. The applications may include a WLAN positioning system (WPS) client 103 and location-based applications 106. As used herein the term "WPS client" refers to software resident on a WLAN-enabled mobile client device that enables the device to communicate with remote portions of a WLAN positioning system in order to estimate the location of the mobile client device. The location-based applications 106 may consume location information output by the WPS client 103. Based on the location information, the location-based applications 106 may provide location-based services, such as turn-by-turn navigation, friend finding, local web search, fleet management, E911, etc.

The WLAN positioning system 100 may further include one or more network servers 107. A network server 107 may include a processor coupled to one or more storage devices, as well as other well-known computer hardware. The storage devices of a network server 107 may store the reference database 104 of the WLAN positioning system 100, as well as a server-side WLAN positioning application (i.e. a "WPS server application") 108 that updates and maintains the reference database 104 and communicates with the WPS client 103, among other functions.

Throughout a particular target geographical area in which the mobile client device 101 is located, there may be WLAN APs 102 that transmit signals. The WPS client 103 receives radio signals from the WLAN APs 102 in range of the mobile client device's radio transceiver, and calculates a location of the mobile client device 101 using WLAN AP data obtained from the reference database 104.

In the example illustrated in FIG. 1, the reference database 104 contains the estimated geographic locations and power profiles of WLAN APs that the WLAN positioning system 100 has collected. A power profile may be generated from a collection of readings that represent the power of a signal from a WLAN AP received at various locations. Using the WLAN AP data for WLAN APs observed by the mobile client device 101, the WPS client 103 may calculate the relative position of the mobile client device 101 and determine its geographic coordinates in the form of latitude and longitude readings. Those readings can then be fed to the location-based applications 106 operating on the mobile client device 101.

ii. Required Level of Service

In some cases, a mobile client device can specify a required level of service, including positioning accuracy and time to fix, that is to be provided by the WLAN positioning system. A mobile client device can specify a different level of service for different operational conditions of the mobile client device, for example, for a particular application utilizing the determined location information, the type of application utilizing the determined location information, remaining battery life, the type of network connection in use, whether the mobile client device is associated or not associated with a WLAN AP, whether the mobile client device is connected to a power outlet or not connected to a power outlet, etc. Accuracy for a level of service may be defined in statistical terms. For example, accuracy may be defined as a fifty percentile (50%) error being below a certain level, or may be defined as a maximum tolerable error.

iii. WPS Tiles

As mentioned above, it may be impossible or impracticable to transfer the entire reference database 104 to the mobile client device. Further it may be highly inefficient to query the remotely-located reference database each time information contained therein is needed by the WPS client 103. As such, to enable the WPS client 103 to operate semi-autonomously, subsets of the reference database may be copied to and stored (e.g., cached) on the mobile client device. The subsets may take the form of "tiles" that each include WLAN AP data for WLAN APs in a bounded geographic region. As used herein, a "tile" refers to set WLAN AP data for WLAN APs in a geographically bounded portion of a reference database, and that includes all or part of the WLAN AP data of the WLAN APs in the reference database that falls within the bounded portion. In addition to WPS AP data, a tile may, though need not, also include information about other types of beacons, for example, cell tower information and/or A-GPS information, for example, a GPS almanac.

Generally, the network server 107 may send tiles to the mobile client device. The tiles may be ones in the general vicinity of the mobile client device, whose WLAN AP data has a relatively high probability of being needed for WLAN positioning and/or of increasing the accuracy of positioning. The mobile client device may maintain (i.e. store) the tiles in a portion of its main storage (e.g., a local memory cache), from which it can be retrieved to satisfy location requests. This may enable the mobile client device to resolve location requests locally on the device, without a need for a network connection to the network server (e.g., reducing a time to fix and minimizing overall power consumption). Further, when the local memory cache does not contain the information necessary to estimate a location of the mobile client device, or the data in the local memory cache is out-of-date, additional or refreshed versions of tiles may be requested from the network server.

As mentioned above, the mobile client device generally has limited resources, such as memory, processing power, and battery power, and there are costs associated with utilizing mobile resources and services, such as cellular network bandwidth. Copying tiles from the network server to the mobile client device and storing them locally may consume resources and incur costs. Accordingly, it is desirable to implement techniques that efficiently select and distribute WLAN AP data, and refresh WLAN AP data already on the mobile client device, to reduce resource consumption and minimize costs.

Optimizing Tiles Transferred i. Loading Mobile Client Device in Advance

In one embodiment, the WPS client 103 may load tiles in advance of their being needed, based on an expected future location of the mobile client device. The expected future location represents a location that may be different from the present location of the mobile client, which the mobile client device is expected to visit in the future. The expected future location may be defined as a particular place, or defined as an area around a place. Under this approach, the WPS client 103 requests one or more tiles from the reference database 104 whose geographic region includes the expected future location. If a mobile client device has defined the expected future location in terms of an area around a place, that area can be used to specify spatial coverage of a tile. If the mobile client device has not defined an area around the place, a tile's spatial coverage may be a default value. Alternatively, it may be calculated based on one or more mobile client device specific qualities, such as a required service level, type of network connection, a speed, available resources (e.g. an amount of memory), etc.

An expected future location of the mobile client device can be directly provided by a user of the mobile client device. For example, a user may enter an address of a place for the specific purpose of obtaining one or more tiles about that location. Alternatively, the expected future location may be determined based on information provided by an application executing on the mobile client device. In such a case, the application may be responding to information entered by a user of the mobile client device, however such information may be entered for other purposes, depending on the functionality of the application. For example, if an application provides turn-by-turn navigation, the expected future location may be a location along a route (e.g., a driving path) determined by that application, such as a destination of the route.

Figure 2:
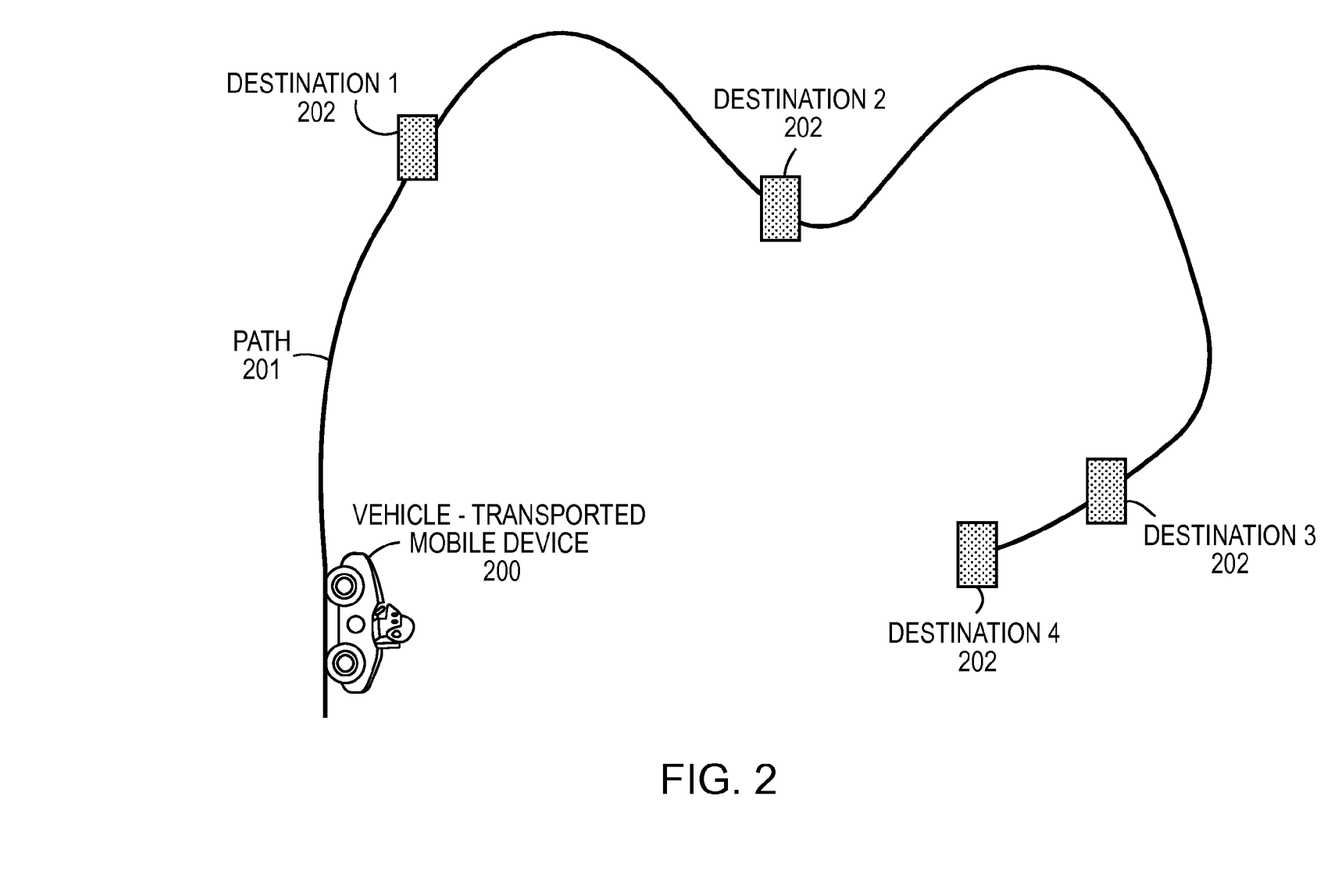
FIG. 2 is a diagram that illustrates a route of a vehicle-transported mobile client device.

FIG. 2 is a diagram that illustrates a route 201 of a vehicle-transported mobile client device 200. A user may have used a turn-by-turn navigation application to determine the route 201 to destinations 202 that the user desires to visit. The WPS client 103 may receive the route 201 from the turn-by-turn navigation application, and in combination with a current estimated location of the mobile client device, retrieve one or more tiles from the reference database 104 associated with visiting the destination 202 (e.g., about the destinations or otherwise along the route), in advance of the mobile client device reaching the destinations.

ii. Sending Tiles Based on Behavior

In one embodiment, the WPS client 103 may retrieve tiles based on the mobile client device's behavior, condition and statistics. Behavior may include a mode of movement, a speed of movement, and/or how long the mobile client device stays in one position (each of which may be derived from sensor data on the mobile client device). Condition may include a type of application active on the mobile client device, a type of network connection available to the mobile client device (e.g., whether using a high-speed WLAN or a cellular data network), an amount of memory available on the mobile client device, and/or a power status of the mobile client device (e.g., whether connected to a power outlet or using internal battery. In the case of a type of application active on the mobile client device, some location-based applications may trigger a tile transfer, while others may not. For example, if the application is providing turn-by-turn navigation, a tile may be transferred to the mobile client device, but if the application is providing a location-based search, a tile may not be transferred to the mobile client device. Statistics may include statistics for location requests by the mobile client device, statistics of usage of tiles in that area globally or locally, and/or statistics of usage of tiles in that area by the mobile client device, a type of network connection, an amount of memory available on the mobile client device, and the like.

In some cases, the WPS client 103 may choose to not retrieve tiles from the network server 107, but instead to request that the network server return an estimated location of the mobile client device directly. This decision may be based on the mobile client device's behavior, condition and statistics. Behavior may include a mode of movement, a speed of movement, and/or how long the mobile client device stays in one position. Condition may include a type of application active on the mobile client device, a type of network connection available to the mobile client device (e.g., whether using a high-speed WLAN or a cellular data network), an amount of memory available on the mobile client device, and/or a power status of the mobile client device (e.g., whether connected to a power outlet or using internal battery). Statistics may include statistics for location requests by the mobile client device, statistics of usage of tiles in that area globally or locally, and/or statistics of usage of tiles in that area by the mobile client device, a type of network connection, an amount of memory available on the mobile client device, and the like. For example, if a location is needed by an application when the mobile client device has been in one position for a long time while on battery power, then the WPS client 103 might request that the network server 107 send an estimated location directly and not send a tile.

Excluding and Including and Certain WLAN AP Data of a Tile i. Reducing WLAN APs for Tiles in High Density Areas In one embodiment, the WPS server application 108 may exclude WLAN AP data for certain WLAN APs from a tile transferred to the mobile client device. In one case, the excluded data may be for areas with a high density of WLAN APs. A minimum required density of WLAN APs may be known or calculated. WLAN AP data for WLAN APs in areas of a tile with density higher than the minimum required density may be removed from the tile, as such data are basically redundant information for WLAN positioning of the mobile client device. Various techniques may be used to determine which WLAN APs should have their data kept and which will be removed. For example, techniques may keep data for WLAN APs that result in the best spatial uniform distribution of WLAN APs in the area. Alternatively, techniques may keep data for WLAN APs with the highest quality, which are considered least probable to have moved, that are most probable to remain operational, and/or are most recently observed.

Figure 3A:
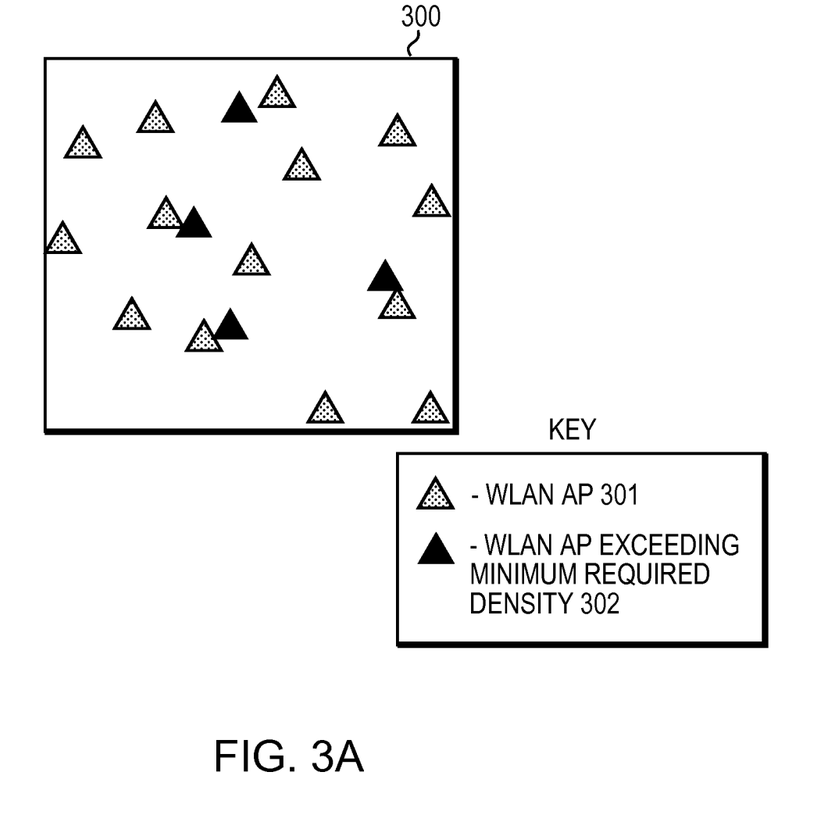
FIG. 3A is a diagram depicting example WLAN APs within an area, where a minimum required density is exceeded.

FIG. 3A is a diagram depicting example WLAN APs 301, 302 within an area 300, where a minimum required density is exceeded. Specifically, WLAN APs 302 exceed the minimum required density, and thereby their WLAN data may be considered redundant and can be removed from the tile without compromising performance of the WLAN positioning system.

The minimum required density of WLAN APs may be calculated empirically from a statistical analysis of performance of the WLAN based positioning system. The statistical analysis may include finding an expected accuracy corresponding to different densities of WLAN APs. Given a mobile client device's required service level (and more specifically, an accuracy requirement), a density of WLAN APs that provides the accuracy may be determined. Generally, there is a saturation density (i.e. a density of APs which maximizes the performance of the WLAN positioning system). A WLAN AP density higher than the saturation density will not further increase accuracy. In some implementations, the saturation density may be used to eliminate WLAN AP data for WLAN APs in the areas of a tile with density higher than the saturation density.

Figure 3B:
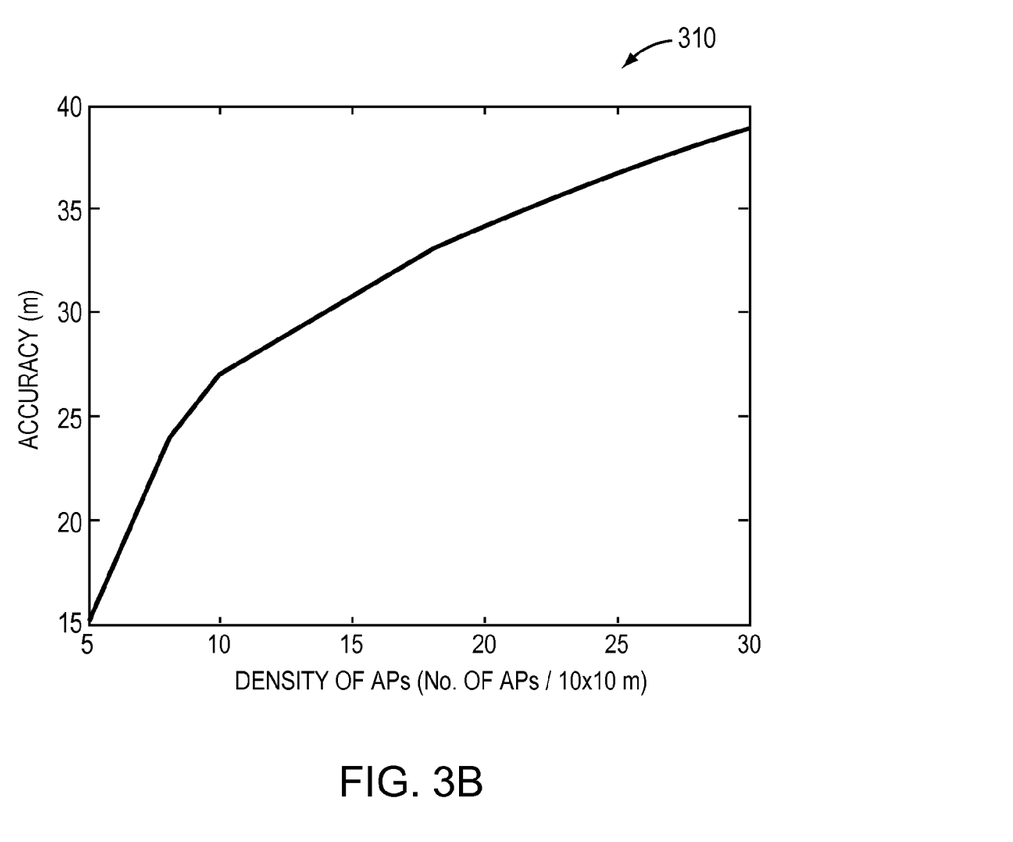
FIG. 3B is a graph depicting an example of empirically calculated accuracy versus density of APs.

FIG. 3B is a graph 310 depicting an example of empirically calculated accuracy versus density of APs. As can be seen, the curve slopes to asymptotically approach a maximum accuracy as the density of APs saturates.

In one example technique for excluding WLAN AP data from a tile for areas with a high density of WLAN APs, assume the minimum required AP density, $d_{min}$, is calculated empirically, and the tile can be divided into small geographical, non-overlapping areas, $A_i$, (e.g., 25 meters (m) by 25 m), having an AP density, $dA_i$. An elevation (e.g., floor level) is selected. WLAN APs at different elevations (e.g., different floor levels) may be considered separately, since WLAN APs at the different floor level might not be able to contribute to positioning on other floors. For the selected elevation (e.g., floor level), if $dA_i > d_{min}$ then continue, otherwise skip excluding APs. Then, the number of APs that can be removed from each area is calculated as $A_i \times (dA_i - d_{min})$. Thereafter, WLAN AP data for WLAN APs is removed in the area $A_i$, (e.g., according to a systematic technique, or randomly). The operations may be repeated for other elevations (e.g., floor levels) and other areas of the tile.

ii. Including Only High Quality WLAN APs

In another embodiment, the WPS server application 108 may exclude WLAN AP data for certain WLAN APs from a tile based on their quality. A WLAN AP may be assigned a quality factor from a positioning perspective. Then, WLAN APs with a quality higher than a threshold may be included (or given a higher priority to be included) in a tile transferred to the mobile client device.

A WLAN AP's quality factor may be assigned in various manners, based on different parameters, for example, an AP radio signal coverage, a quality of a location estimate of the WLAN AP's location, etc. In one implementation, the quality factor may be calculated using a method described in U.S. Pat. No. 7,551,579, entitled "Calculation of Quality of WLAN Access Point Characterization for Use in a WLAN Positioning System," the contents of which are incorporated by reference herein in their entirety. Alternatively, other calculation methods may be used to determine a quality factor of a WLAN AP. Similarly, the threshold to which the quality factor is compared may be calculated in a variety of different manners. In one implementation, the threshold may be calculated as a function of a density of WLAN APs, a required level of service of the mobile client device, and characteristics of an area covered by the tile.

Figure 4:
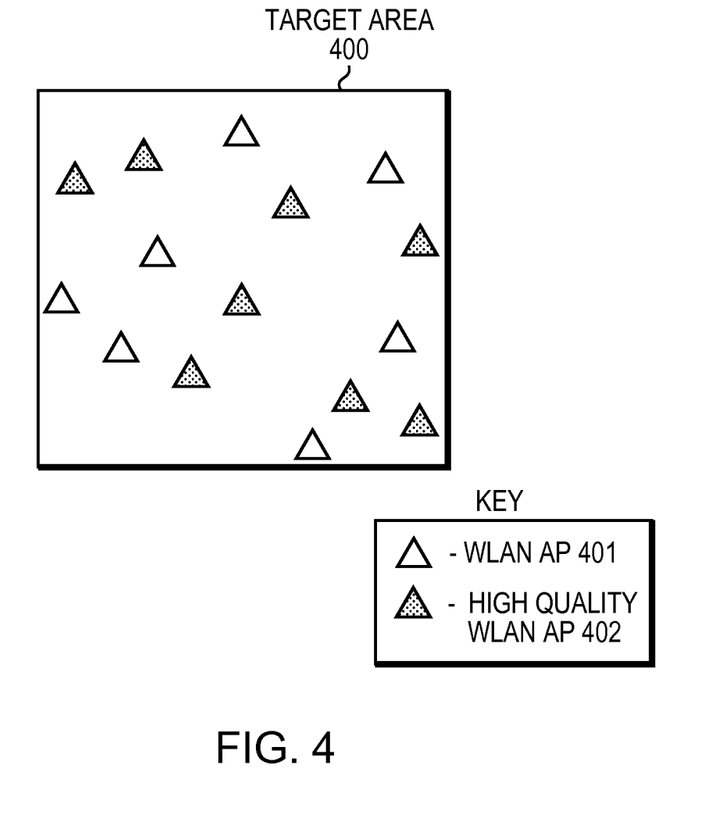
FIG. 4 is diagram depicting example WLAN APs within a tile, where APs are of different quality.

FIG. 4 is a diagram depicting example WLAN APs 401, 402 within a tile where APs are of different quality. High quality access point 402 (i.e. WLAN APs with a quality higher than the threshold) may be included (or given a higher priority to be included) in a tile associated with the area 400. Low quality WLAN APs may be excluded.

iii. Excluding Inactive WLAN APs

In still another embodiment, the WPS server application 108 may exclude WLAN AP data for certain WLAN APs that are determined to be inactive. Examples of inactive WLAN APs include ones which are turned off, decommissioned, out of order, or have moved but have not yet been detected in their new location. An inactivity probability may be calculated, and WLAN AP data for WLAN APs whose inactivity probability exceeds a given threshold may be excluded from a tile. In one implementation, the inactivity probability of a given WLAN AP is estimated from observations over time. For example, a WLAN AP that has been observed almost every week for twelve months, and not observed in the last 30 days, may be given a high inactivity probability. Further details of techniques for determining such probabilities may be found in U.S. Patent Application Publication No. 2011/0306361, entitled "Methods of and Systems for Measuring Beacon Stability of Wireless Access Points", the contents of which are incorporated by reference herein in their entirety.

Alternatively, whether or not a WLAN AP is considered inactive may be determined in another manner. One simple alternative approach is to include data for only WLAN APs that have been observed in a last threshold, N, number of days, for example the last 180 days. This approach assumes that the inactivity probability of a WLAN AP increases as the duration of time from its last observation increases. The threshold number of days may be determined as a function of one or more parameters, such as a rate of detecting WLAN APs globally and locally (e.g., in the same area as the WLAN AP), and/or the number of active mobile client devices globally and locally (e.g., the number of mobile client devices in the same area as the WLAN AP). The threshold number of days can also be set empirically based on analyzing statistically active WLAN APs and also inactive WLAN APs.

Another alternative approach is to determine a minimum required number of WLAN APs in a tile and include only WLAN AP data for the most recently detected WLAN APs, up to a required number of WLAN APs in the tile.

iv. Including WLAN APs From High Usage Areas

In yet another embodiment, the WPS server application 108 may designate certain WLAN APs as high priority for inclusion in a tile based on a measure of likelihood of usage in estimating a location of mobile client devices. While WLAN AP data for various WLAN APs may be excluded according to the techniques discussed above, WLAN AP data for high priority WLAN APs may be more likely to be retained, as compared to other WLAN APs.

The measure of likelihood of usage may be based on density of human traffic, density of location requests, and/or other factors. WLAN AP data for WLAN APs in areas with higher density of human traffic or higher density of location requests may be associated with higher priority. For example, WLAN AP data for WLAN APs of a busy shopping center may be more likely to be used to position a mobile client device than WLAN AP data for WLAN APs of residential areas in the same general vicinity. WLAN AP data for WLAN APs of shopping centers and other areas whose traffic density or location requests are higher than a given threshold may be included, while WLAN AP data for WLAN APs in other areas may be excluded.

Figure 5:
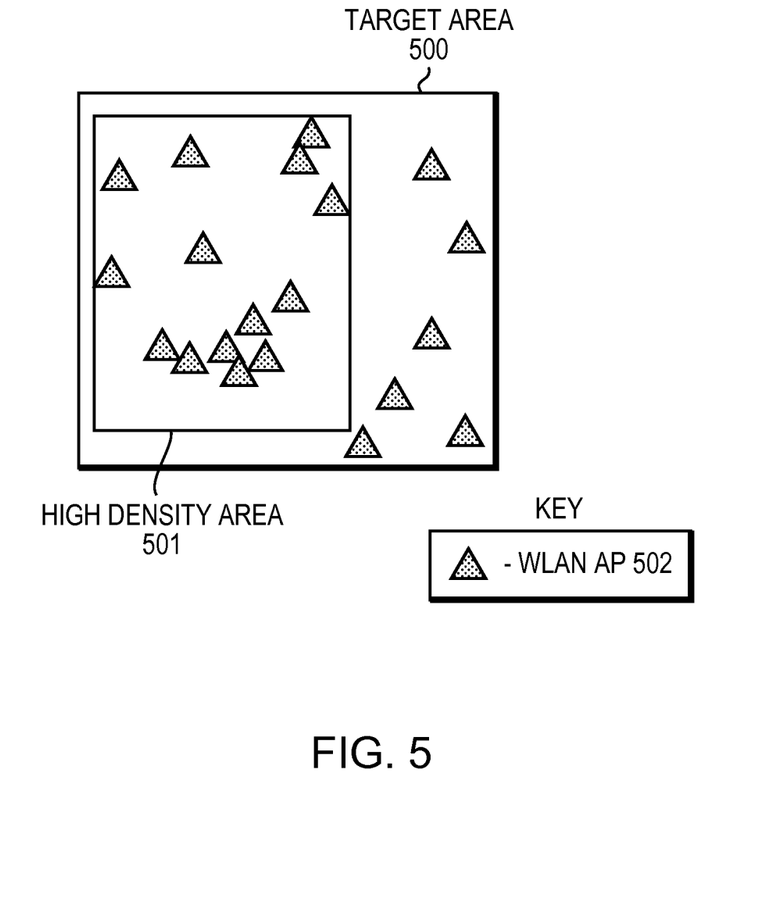
FIG. 5 is a diagram depicting example WLAN APs within a tile, where usage density varies.

FIG. 5 is a diagram depicting example WLAN APs 502 within an area 500, where usage density varies. An area 501 may be a high density area (e.g., have a higher density of human traffic or higher density of location requests compared to the rest of the area within the tile). WLAN AP data for WLAN APs within the high density area 501 may be given a higher priority to be included in the tile being transferred to the mobile client device.

v. Include Places of Interest in the Past

In another embodiment, the WPS server application 108 may designate certain WLAN APs as high priority for inclusion in a tile based on statistics of places that the mobile client device visited in the past or based on the mobile client device's user's interests. A history of places that the mobile client device has visited in the past provides an understanding of the importance of different locations, and areas that the user is generally visiting may be accorded a higher priority. For example, based on history of places that the mobile client device has visited, locations such as the home, work place, and common shopping places of the user of the mobile client device may be accorded a higher priority, and WLAN AP data for WLAN APs covering these places may be included.

vi. Multi-Resolution Tiles

In another embodiment, the WPS server application 108 may include WPS data for different densities of WLAN APs into a tile based on a required level of service of the mobile client device. For example, a mobile client device with a required accuracy of 500 m may receive tiles with lower density of WLAN APs compared to another mobile client device with a required accuracy of 50 m.

Figure 6:
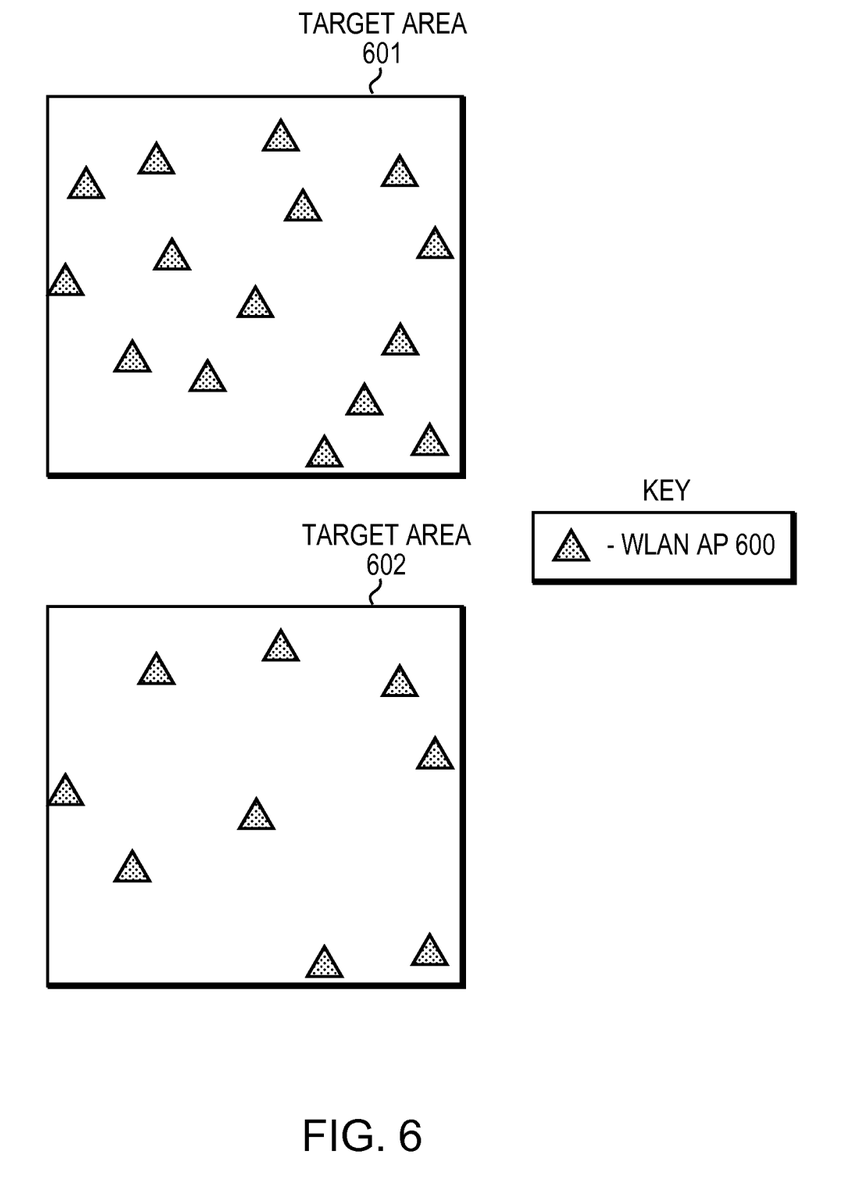
FIG. 6 is a diagram depicting two tiles of different densities for the same geographic region.

FIG. 6 is a diagram depicting two tiles 601, 602 of different densities for the same geographic region. Tile 601 provides a higher density of WLAN APs 600 and provides higher positioning accuracy, compared to tile 602 with a lower density of WLAN APs.

Efficient Management of Wlan AP Data on a Mobile Client Device i. Saving and Purging Tiles In another embodiment, the WPS client 103 may efficiently manage transfer and retention of WLAN AP data. As described above, the mobile client device maintains tiles in a portion of memory (e.g., a local memory cache), from which they can be retrieved to satisfy location requests. Tiles in the local memory cache may be purged when the WPS client 103 does not expect to use the WLAN AP data in them. In one implementation, such decision may be based on prior usage statistics, such as a number of hits in a given prior period of time (e.g., the last 30 days).

Figure 7:
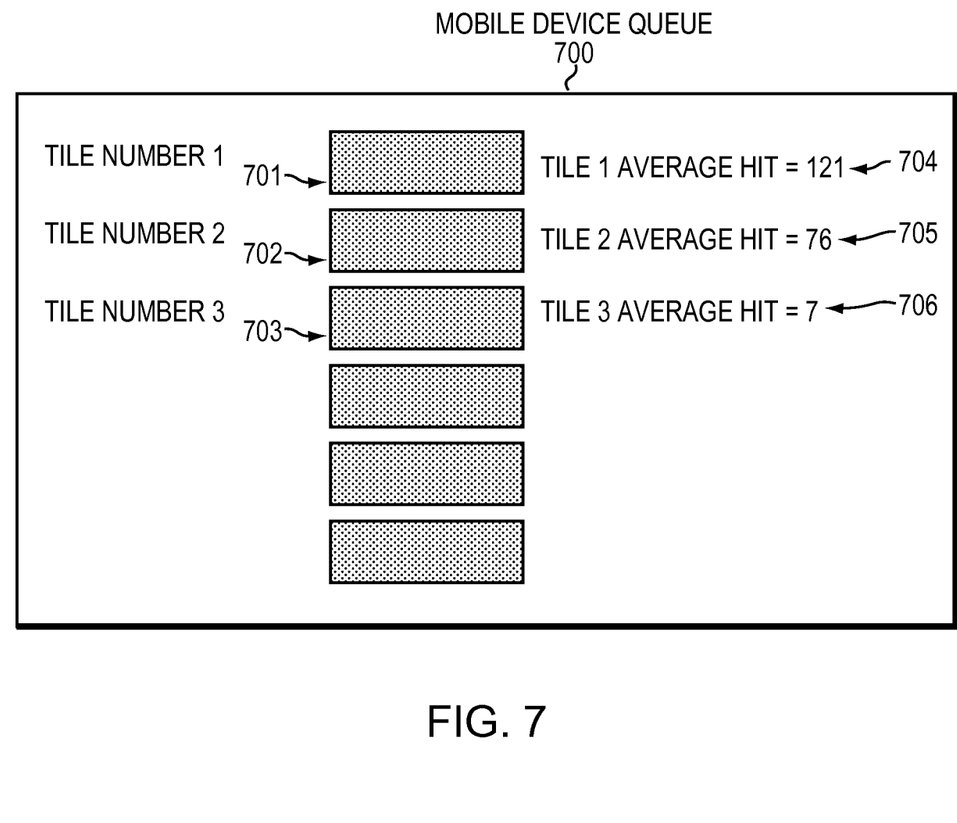
FIG. 7 is a diagram of an example tile queue that may be maintained in the local memory cache of a mobile client device to store tiles.

FIG. 7 is a diagram of an example tile queue 700 that may be maintained in the local memory cache of a mobile client device to stores tiles 701, 702, 703. In this particular example, the usage statistics are the number of hits in the last 30 days, and the tiles 701, 702, 703 are prioritized in the tile queue 700 according to their average hit rate 704, 705, 706 during that period of time, where a hit represents a use of WLAN AP data of the tile. The tiles with lower hit rate are purged in case of a need to release memory space. For example, as shown in FIG. 7, tile 701 at the top of the tile queue 700 has the highest hit rate, and therefore is the tile least likely to be purged. Tile 703 at the bottom of the queue is most likely to be purged as more memory space is needed.

Similar techniques may be applied to decisions to retrieve/update tiles to the mobile client device. Statistics may be stored for the geographic region encompassing a tile even if the WPS client 103 made the decision to not retrieve that tile from the network server 107 or if that tile was already purged from the memory of the client. For example, a mobile device client might decide to not retrieve a tile from the server the first time that it is accessed when on battery power, but when the hit rate grows large enough, it may decide to download it from the server.

In another implementation, a decision on which tiles to purge may be based on probability of usage in positioning. The probability of usage may be calculated based on a rate of usage over time and/or an elapsed time since the last usage. For example, the probability can be the number of times WLAN AP data of a tile has been used in the last two months, the number of times the WLAN AP data of the tile has been used per week weighted exponentially with time (e.g., if used recently then the weight is larger), etc.

In still another implementation, a decision on which tiles to purge may be based on a type of application executing on the mobile client device. Tiles obtained in connection with different applications may have different likelihoods of being purged or policy for being purged. For example, tiles associated with an application that provides turn-by-turn navigation might get purged after their use, but tiles associated with a child tracking application might not be purged (e.g., based on an assumption that children are less mobile and go to only a few places repeatedly).

Further, the number of tiles maintained on a mobile client device may be managed to optimize local memory cache usage based on an amount of memory available on the mobile client device. In one implementation, cache usage may be optimized according to a cost-benefit equation that balances a cost of memory and the number of tiles and level of priority of those tiles cached on the mobile client device. The cost of memory can depend on the total available memory on the mobile client device. For example, in one extreme, when there is ample available memory, cost may be so low that all tiles of a set of tiles may be maintained locally. If, on the other hand, there is very little memory available, cost may be so high that, no tiles are maintained locally or only one tile at a time is maintained locally. For situations in between, a cost associated with using the memory may be compared to a benefit of maintaining the tile locally (e.g., based on its priority, likelihood that the tile is to be used in positioning, the number of tiles already maintained locally, etc.).

Further, a decision to update tiles maintained on a mobile client device may depend on the device's network connection, the available connection bandwidth, and/or the cost of connection. The WPS client 103 may determine to update tiles if, for example, the network connection is rapid and reliable (e.g., the connection is a WLAN that is coupled to a high speed Internet connection), because it will not be problematic or expensive to update tiles. On the other hand, the WPS client 103 may determine to not update tiles, or update only a limited number of tiles, if the network connection is not reliable, or if it would be expensive to update tiles (e.g., the connection is a cellular data connection).

Further, a decision to update tiles maintained on a mobile client device may be based on a mode of motion of the mobile client device, for example, walking, driving, or speed of motion. For example, if a user is driving, the WPS client 103 may determine to transfer many tiles to the mobile client device based on the relatively high velocity.

Further, a decision to update tiles maintained on a mobile client device may be based on its power source. For example, if the mobile client device 101 is connected to power outlet, then a relatively large update may be sent without depleting the device's battery.

ii. Refreshing Tiles

WLAN AP data maintained on the mobile client device will become out-of data over time, as WLAN APs are activated, moved, or decommissioned. Accordingly, tiles already maintained on the mobile client device should be refreshed to include more current information, to ensure that the WLAN positioning system maintains its required level of accuracy. In one embodiment, the WPS client 103 triggers a refresh of a locally maintained tile based on measured statistics. The statistics may include the rate of change of WLAN AP data of the tile, the amount of WLAN AP data that has changed in the tile since the last transfer to the mobile client device, and the required level of service of the mobile client device. For example, if WLAN AP data for less than a predetermined percentage of WLAN APs of a tile has changed since the tile was obtained by the mobile client device, the WPS client 103 may decide the tile does not need to be updated. The refreshed tile may be refreshed by downloading an entire new tile that replaces the previous one, or the network server 107 may send only the differences between the version of the tile on the mobile client device and the one on the server.

Multilayer Tiling

In one embodiment, the WPS client 103 may efficiently distribute WLAN AP data from the main storage of the mobile client device to one or more subsystems (e.g., the WLAN network interface) within the device. The WPS client 103 may create one or more sub-tiles from a tile maintained in the main storage, that include a selected part of the tile (e.g., a part of the geographic region represented by the tile). The sub-tile may be copied to, and stored in, the subsystem (e.g., in memory internal to the WLAN network interface) while the original tile (in this context, referred to as the "main tile") is maintained in the main storage, such that part of the WLAN AP data of the original tile is directly available to the subsystem. The subsystem may have more limited resources (e.g., more limited processing power or memory capacity) than that provided by the CPU and main storage of the mobile client device, and the smaller size of a sub-tile may be better adapted to these capabilities. By storing a part of a tile on the sub-system, the subsystem can access WLAN AP data directly, without engagement of the CPU, to locate the mobile client device. Storing sub-tiles on subsystems of the mobile client may allow for reduced power consumption, by permitting an estimate of the location of the mobile client device to be made using only information at subsystem, without requiring access to main storage or the CPU.

Figure 8:
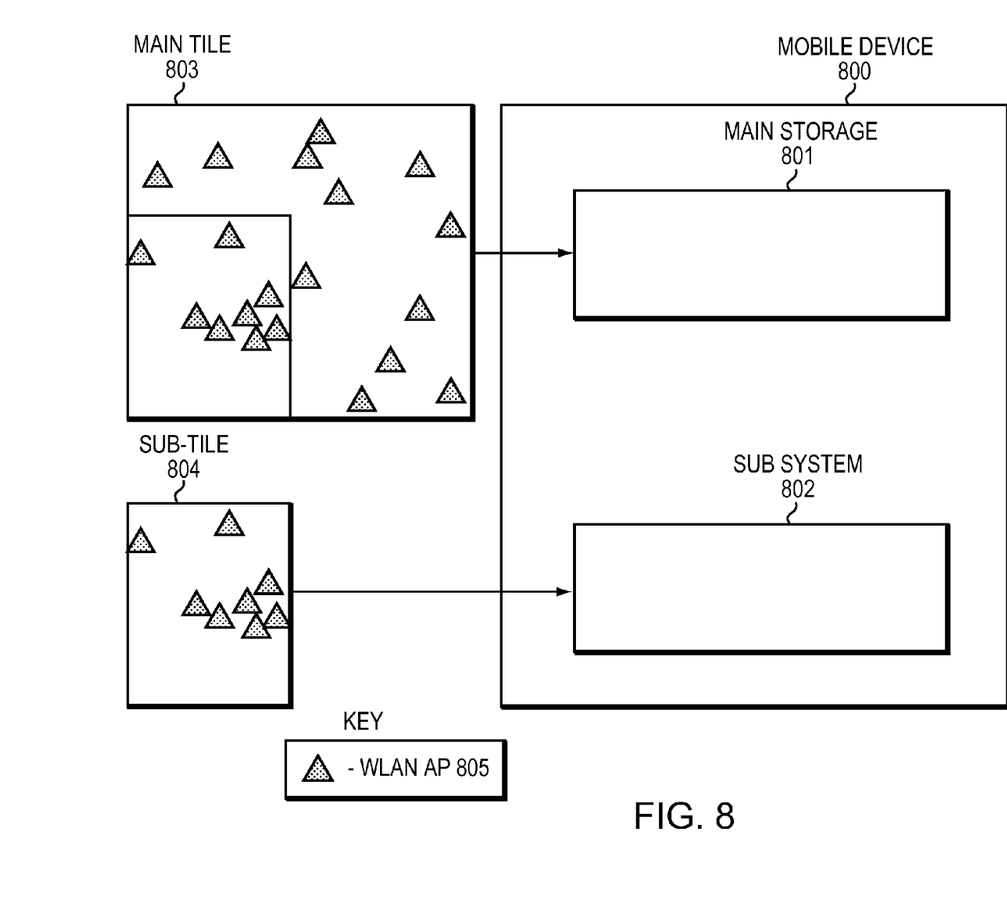
FIG. 8 is a diagram illustrating an example of copying a sub-tile to a subsystem (e.g., a WLAN network interface) of a mobile client device.

FIG. 8 is a diagram illustrating an example of copying a sub-tile to a subsystem (e.g., a WLAN network interface) of a mobile client device. The mobile client device 800 includes, among other hardware components, a main storage 801 and a sub-system 802 having its own local memory. The main storage 801 stores WLAN AP data for APs 805 of an entire main tile 803. A part of the main tile 803 (e.g., a part of the geographic region represented by the tile) is copied to the sub-tile 804, which is copied in sub-system 802 to increase the efficiency of the operation of the mobile client device, as described above.

In some implementations, multilayer tiling may be extended to more than two layers (i.e. more than a main tile and a sub-tile), in which information at each layer can be segmented into smaller tiles and provided to a lower layer, and this process repeated to produce a desired number of layers Further, in some implementations, a size of sub-tiles copied to subsystems can be reduced by abbreviating the WLAN AP data maintained for APs within the sub-tile. For example, rather than include a full unique identifier (e.g., MAC address) of each WLAN AP, only a last couple of digits of an identifier may be included (since the tile size is so small there is a good chance that WLAN APs are still unique). If the WLAN APs are not unique, the subsystem can access the CPU and main storage, to retrieve more complete information.

Further, in some implementations, rather than create sub-tiles by the WPS client 103 on the mobile client device, sub-tiles may be created on the network server 107, which divides tiles into multiple layers, and transmits one layer at a time to the mobile client device. Such technique may reduce time to first fix, by allowing the mobile client device to estimate its location using the first layer of a tile's data, and subsequently increase accuracy of the location estimate as more WLAN location data in other layers is transferred to the mobile client device.

Example of Use

The above describes techniques may be used to improve operation in a variety of different real-world situations. In one example, a user of a mobile client device may live in a suburb of a city but work downtown. In the morning, the user may identify on the mobile client device a new place that he or she is going to have a meeting downtown. This action may trigger the download of tiles from a network server corresponding to the new area of the meeting. The download may occur, for example, if the mobile client device is connected to a WLAN (e.g., WiFi network) that is coupled to a high speed Internet connection. Further, in this example, tiles that include the user's home and workplace may already be maintained on the mobile client device. However, the mobile client device may refresh these tiles, while connected to the WLAN. Such activities may permit semi-autonomous operation and minimize costs (e.g., such as for cellular network bandwidth) during the ensuing day.

CONCLUSION

It should be understood that the above described techniques and portions thereof may be utilized together, individually, or in combination with other techniques, depending on the implementation. Further, it should be understood that aspects of the techniques may be modified, added to, removed, or otherwise changed depending on the implementation. While various software is described as resident on particular hardware devices, it should be understood that the software, and portions thereof, may be otherwise located, such that operations may be performed on different devices arranged in different configurations. Operations described as being performed on separate devices may be performed on the same device, while operations described as being performed on one device may be split among multiple devices.

Further, while specific example hardware and software are discussed above, it should be understood that the technique may be implemented using a variety of different types of hardware, software, and combination thereof. Such hardware may include a variety of types of processors, memory chips, programmable logic circuits, application specific integrated circuits, and/or other types of hardware components that support execution of software. Such software may include executable instructions that implement applications stored in a non-transitory computer-readable medium, such as a volatile or persistent memory device, a hard-disk, or other data store. Combinations of software and hardware may be adapted to suit different environments and applications. Accordingly, it should be understood that the above descriptions are meant to be taken only by way of example.

What is claimed is:

1. A method comprising:
maintaining a reference database on a network server, the reference database storing WLAN AP data that includes at least locations of WLAN APs or fingerprint information for signals transmitted by WLAN APs;
determining an expected future location for a mobile client device, the expected future location representing a location different than a present location of the mobile client device, the expected future location determined based on information provided by a user of the mobile client device or information provided by an application executing on the mobile client device;
determining a condition of the mobile client device, the condition to include at least one of a type of the application executing on the mobile client device or a type of network connection available to the mobile client device;
in response to both the determining the expected future location and the determining the condition of the mobile client device, transferring one or more tiles from the reference database to the mobile client device for a bounded geographic region that includes the expected future location; and
storing the one or more tiles on the mobile client device to be available for use in satisfying one or more subsequently received requests for estimation of location of the mobile client device.

2. The method of claim 1, wherein the expected future location is determined based on information provided by the user of the mobile client device, and the information provided by the user includes a location.

3. The method of claim 1, wherein the expected future location is determined based on information provided by the application executing on the mobile client device.

4. The method of claim 3, wherein the application is a turn-by-turn navigation application that provides turn-by-turn guidance for a route, and the expected future location is determined as a location along the route.

5. The method of claim 1, further comprising excluding WLAN AP data from a tile for one or more WLAN APs based on one or more criteria.

6. The method of claim 5, wherein the one or more criteria include a quality factor of WLAN APs that measures usefulness in positioning, and the one or more WLAN APs are WLAN APs whose quality factor is less than a threshold.

7. The method of claim 5, wherein the one or more criteria include an activity level of WLAN APs, and the one or more WLAN APs are WLAN APs that are inactive.

8. The method of claim 5, further comprising:
retaining WLAN AP data for high priority APs, wherein a WLAN AP is considered high priority based on a measure of likelihood of usage in estimating a location of mobile client devices.

9. The method of claim 5, further comprising:
retaining WLAN AP data for high priority APs, wherein a WLAN AP is considered high priority based on a proximity to places visited by the mobile client device.

10. The method of claim 5, wherein the excluding yields a tile having a given density of WLAN APs, the given density based on a required level of service of the mobile client device.

11. The method of claim 10, wherein the tile is a version of a multi-resolution tile, each version of the multi-resolution tile having a different density of WLAN APs.

12. The method of claim 1, further comprising:
purging a tile of the one or more tiles stored on the mobile client device based on usage of the WLAN AP data in the tile.

13. The method of claim 12, wherein the usage includes an average hit rate in a given period of time, where a hit represents a use of the WLAN AP data of the tile in estimation of the location of the mobile client device, and the purging purges the tile having a lowest hit rate of the one or more tiles.

14. The method of claim 12, wherein usage includes a probability of using the tile, and the purging purges the tile having a lowest probability of usage.

15. The method of claim 12, wherein usage is based on a type of application executing on the mobile client device, and different applications have different policies for purging tiles.

16. The method of claim 1, wherein the condition further includes at least one of: an amount of available memory on the mobile client device an available bandwidth of the network connection, a cost of the network connection, a mode of motion of the mobile client device, or a power source of the mobile client device.

17. The method of claim 1, further comprising:
refreshing the WLAN AP data of the one or more tiles stored on the mobile client device in response to at least a statistical measure of change to the WLAN AP data in the reference database since the tile was transferred to the mobile client device.

18. A method comprising:
maintaining a reference database on a network server, the reference database storing WLAN AP data that includes at least locations of WLAN APs or fingerprint information for signals transmitted by WLAN APs;
determining an expected future location, the expected future location representing a location different than a present location of a mobile client device, which the mobile client device is expected to visit in the future;
transferring one or more tiles from the reference database to the mobile client device for a bounded geographic region that includes the expected future location, the one or more tiles to exclude WLAN AP data for one or more WLAN APs based on one or more criteria, wherein the one or more criteria includes a minimum required density of WLAN APs, and the one or more WLAN APs are WLAN APs that exceed the minimum required density; and
storing the one or more tiles on the mobile client device to be available for use in satisfying one or more subsequently received requests for estimation of location of the mobile client device.

19. The method of claim 18, wherein the minimum required density is based on a required service level of the mobile client device.

20. A method comprising:
maintaining a reference database on a network server, the reference database storing WLAN AP data that includes at least locations of WLAN APs or fingerprint information for signals transmitted by WLAN APs;
determining an expected future location for a mobile client device, the expected future location representing a location different than a present location of the mobile client device, the expected future location determined based on information provided by a user of the mobile client device or information provided by an application executing on the mobile client device;

transferring one or more tiles from the reference database to the mobile client device for a bounded geographic region that includes the expected future location;

storing the one or more tiles in a main storage of the mobile client device;

creating a sub-tile from at least one tile of the one or more tiles stored in the main storage, the sub-tile to include a selected part of the at least one tile; and transferring the sub-tile to a subsystem of the mobile client device to be available for use for estimation of location of the mobile client device.

21. The method of claim 20, wherein the subsystem is a WLAN network interface.

22. The method of claim 20, wherein the selected part of the at least one tile corresponds to a part of the bounded geographic region for the at least one tile.

23. A method comprising:
maintaining a reference database on a network server, the reference database storing WLAN AP data that includes at least locations of WLAN APs or fingerprint information for signals transmitted by WLAN APs;

selecting one or more tiles from the reference database that includes WLAN AP data for a bounded geographic region based on an expected future location that a mobile client device, the expected future location determined at least in part based on information provided by a user of the mobile client device or information provided by an application executing on the mobile client device;

determining a condition of the mobile client device, the condition to include at least one of a type of the application executing on the mobile client device or a type of network connection available to the mobile client device;

in response to both the selecting one or more tiles and the determining the condition of the mobile client device, transferring the one or more tiles to the mobile client device;

storing the one or more tiles on the mobile client device; and subsequent to the storing, purging a tile of the one or more tiles stored on the mobile client device based on usage of the WLAN AP data in the tile.

24. The method of claim 23, wherein the usage includes an average hit rate in a given period of time, where a hit represents a use of the WLAN AP data of the tile in estimation of a location of the mobile client device, and the purging purges the tile having a lowest hit rate of the one or more tiles.

25. The method of claim 23, wherein usage includes a probability of using the tile, and the purging purges the tile having a lowest probability of usage.

26. The method of claim 23, wherein usage is based on a type of application executing on the mobile client device, and different applications have different policies for purging tiles.

27. The method of claim 23, wherein the condition further includes at least one of: an amount of available memory on the mobile client device, an available bandwidth of the network connection, a cost of the network connection, a mode of motion of the mobile client device, or a power source of the mobile client device.

28. A network server comprising:
a processor; and
a storage device configured to store executable instructions, the executable instructions when executed on the processor operable to:
maintain a reference database in the storage device, the reference database storing WLAN AP data that includes at least locations of WLAN APs or fingerprint information for signals transmitted by WLAN APs;
select a tile from the reference database that includes WLAN AP data for a bounded geographic region;
exclude WLAN AP data from the tile for one or more WLAN APs selected based on one or more criteria, wherein the one or more criteria include a minimum required density of WLAN APs, and the one or more WLAN APs are WLAN APs that exceed the minimum required density; and
transfer the tile to a mobile client device for storage on the mobile client device for use in satisfying one or more requests for estimation of location of the mobile device.

29. The network server of claim 28, wherein the minimum required density is based on a required service level of the mobile client device.

30. The network server of claim 28, wherein the one or more criteria also include a quality factor of WLAN APs that measures usefulness in positioning, and the one or more WLAN APs are WLAN APs whose quality factor is less than a threshold.

31. The network server of claim 28, wherein the one or more criteria also include an activity level of WLAN APs, and the one or more WLAN APs are WLAN APs that are inactive.

32. The network server of claim 28, wherein the executable instructions when executed on the processor are further operable to:
retain WLAN AP data for high priority APs, wherein a WLAN AP is considered high priority based on a measure of likelihood of usage in estimating a location of mobile client devices.

33. The network server of claim 28, wherein the executable instructions when executed on the processor are further operable to:
retain WLAN AP data for high priority APs, wherein a WLAN AP is considered high priority based on a proximity to places visited by the mobile client device.

34. The network server of claim 28, wherein the exclusion yields a tile having a given density of WLAN APs, the given density based on a required level of service of the mobile client device.

35. The network server of claim 28, wherein the tile is a version of a multi-resolution tile, each version of the multi-resolution tile having a different density of WLAN APs.

* * * * *